United States Patent
Radl et al.

(10) Patent No.: US 11,984,787 B2
(45) Date of Patent: May 14, 2024

(54) MOTOR END CAP DESIGN THAT FUNCTIONS AS A LUBE DISTRIBUTOR IN HYBRID TRANSMISSIONS

(71) Applicant: Ford Global Technologies, LLC, Dearborn, MI (US)

(72) Inventors: Nathan Radl, Canton, MI (US); Emily Yang, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 338 days.

(21) Appl. No.: 16/778,907

(22) Filed: Jan. 31, 2020

(65) Prior Publication Data

US 2021/0242746 A1 Aug. 5, 2021

(51) Int. Cl.
*H02K 5/15* (2006.01)
*H02K 5/20* (2006.01)
*H02K 9/19* (2006.01)

(52) U.S. Cl.
CPC ............. *H02K 5/15* (2013.01); *H02K 5/203* (2021.01); *H02K 9/19* (2013.01)

(58) Field of Classification Search
CPC ............ H02K 5/20; H02K 5/203; H02K 5/15; H02K 9/19; H02K 5/04; H02K 1/32; H02K 1/20; H02K 9/00; H02K 9/02; H02K 9/04; H02K 9/06; H02K 9/08; H02K 9/10; H02K 9/12; H02K 9/14; H02K 9/16; H02K 9/18; H02K 9/193; H02K 9/197; H02K 9/20; H02K 9/22; H02K 9/223; H02K 9/225; H02K 9/227; H02K 9/24; H02K 1/28; H02K 1/30
USPC ..... 310/52, 53, 54, 55, 57, 58, 59, 60 R, 61, 310/60 A, 64
See application file for complete search history.

(56) References Cited

U.S. PATENT DOCUMENTS

| | | | |
|---|---|---|---|
| 4,800,309 A | 1/1989 | Lakin | |
| 5,969,447 A | 10/1999 | Periyathamby et al. | |
| 6,234,767 B1 * | 5/2001 | Takeda | H02K 9/06 417/366 |
| 8,456,046 B2 | 6/2013 | Bradfield | |
| 2011/0273040 A1 * | 11/2011 | Chamberlin | H02K 1/32 310/59 |
| 2012/0299404 A1 * | 11/2012 | Yamamoto | H02K 1/28 310/61 |
| 2015/0288235 A1 * | 10/2015 | Tojima | H02K 16/04 310/46 |
| 2016/0261158 A1 * | 9/2016 | Horii | H02K 1/274 |
| 2017/0310190 A1 * | 10/2017 | Degner | H02K 1/32 |
| 2018/0205294 A1 * | 7/2018 | Manabe | H02K 9/19 |
| 2018/0219455 A1 * | 8/2018 | Goldstein | H02K 7/006 |
| 2019/0319505 A1 * | 10/2019 | Degner | H02K 5/203 |
| 2019/0393747 A1 * | 12/2019 | Tang | H02K 5/20 |

* cited by examiner

*Primary Examiner* — Alexander A Singh
(74) *Attorney, Agent, or Firm* — David B. Kelley; Brooks Kushman, P.C.

(57) ABSTRACT

An endplate for an electric machine may include a disc-like body defining at least one opening and a corresponding channel extending therefrom, the channel extending from the at least one opening to a distal diameter of the body, the opening configured to allow coolant to pass therethrough, and a lip arranged around a circumference of the body and extending therefrom, the lip configured to guide the coolant into the at least one opening to supply coolant at an end winding of a stator of the electric machine.

5 Claims, 5 Drawing Sheets

MOTOR END CAP DESIGN THAT FUNCTIONS AS A LUBE DISTRIBUTOR IN HYBRID TRANSMISSIONS

TECHNICAL FIELD

Disclosed herein are coolant orifice plates for electric machine cooling.

BACKGROUND

Electric machines, including electric generators, motors, etc., may include a stator 74 surrounding a rotor. The stator 74 may be attached to a case and energy may flow through the stator 74 to or from the rotor. The stator 74 may include an iron core and copper windings. During operation, the copper windings may carry current, which in turn may generate heat.

SUMMARY

An endplate for an electric machine may include a disc-like body defining at least one opening and a corresponding channel extending therefrom, the channel extending from the at least one opening to a distal diameter of the body, the opening configured to allow coolant to pass therethrough, and a lip arranged around a circumference of the body and extending therefrom, the lip configured to guide the coolant into the at least one opening to supply coolant at an end winding of a stator of the electric machine.

An endplate for an electric machine may include a disc-like body defining at least one opening and a corresponding channel extending therefrom, the channel extending from the at least one opening to a distal diameter of the body, the at least one opening configured to allow coolant to pass therethrough, a lip arranged around the distal diameter of the body and configured to guide the coolant into the at least one opening to supply coolant at an end winding of the electric machine, and a cover configured to abut and cover the lip to maintain the coolant within the cover and guide the coolant into the least one opening.

A vehicle electric machine may include a stator including end windings extending axially from the stator, a rotor disposed within the stator and including two rotor endplates, each endplate having a disc-like body defining at least one opening configured to allow coolant to pass therethrough, and an annular ring configured to abut and cover a portion of the body of one of the two rotor endplates, the annular ring having a plurality of radially extending channels configured to direct coolant from the at least one opening of the end plate to the end windings of the stator during operation of the electric machine.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Electric machines, including electric generators, motors, etc., may include a stator surrounding a rotor. The stator may be attached to a case and energy may flow through the stator to or from the rotor. The stator may include an iron core and copper windings. During operation, the copper windings may carry current, which in turn may generate heat. The iron core may also generate heat. However, this heat may cause inefficiencies in the motor. In order to decrease such inefficiencies, the stator may be cooled by a cooling medium, such as transmission fluid/oil, lubricant, coolant, other liquid, etc. This cooling medium may reduce the temperature of the winding and therefore increase the winding's ability to carry current. The end windings may be cooled by the cooling medium.

Typically, electric machines are cooled by dripping automotive transmission fluid (ATF) onto the end windings through orifices in a transmission housing. Spay configurations or centrifugal impingement cooling from the rotor end plates may also be used. However, such cooling schemes may lead to sparse or spotty coverage of the cooling medium over the copper windings and iron core. This non-uniformity of the coolant flow may lead to localized hot spots or areas with extremely high temperatures in the end windings. These systems may also lead to wasted and unused fluid.

Disclosed herein is an endplate for a traction motor rotor that is configured to direct wasted fluid back to the end windings of a stator 74 to further cool the end windings. The endplate may define a plurality of openings for fluid (e.g., coolant) escape. Normally, these openings are open to the surrounding environment and the fluid tends to drip down the face of the endplate due to gravity. As a result, a large portion of the motor end windings are left untouched by coolant and therefore inadequately cooled.

The endplate may define a plurality of channels extending from the openings to direct and distribute the coolant escaping through the holes during spinning. The centrifugal force may allow the coolant to escape through the channels. A lip may extend around the outer circumference of the endplate between the channels to help maintain the coolant within the endplate, and a cover may be arranged over the lip. Thus, all, or nearly all of the fluid may be directed from the openings through the channels. The fluid will thus be used to be evenly distributed over the end windings, and further facilitate even, efficient cooling.

The higher centrifugal forces will increase the cooling capabilities and will significantly reduce the maximum average operating temperatures of the end windings, which in turn can reduce the required electric machine size. The more uniform coverage may also increase electric machine torque densities.

Figure 1:
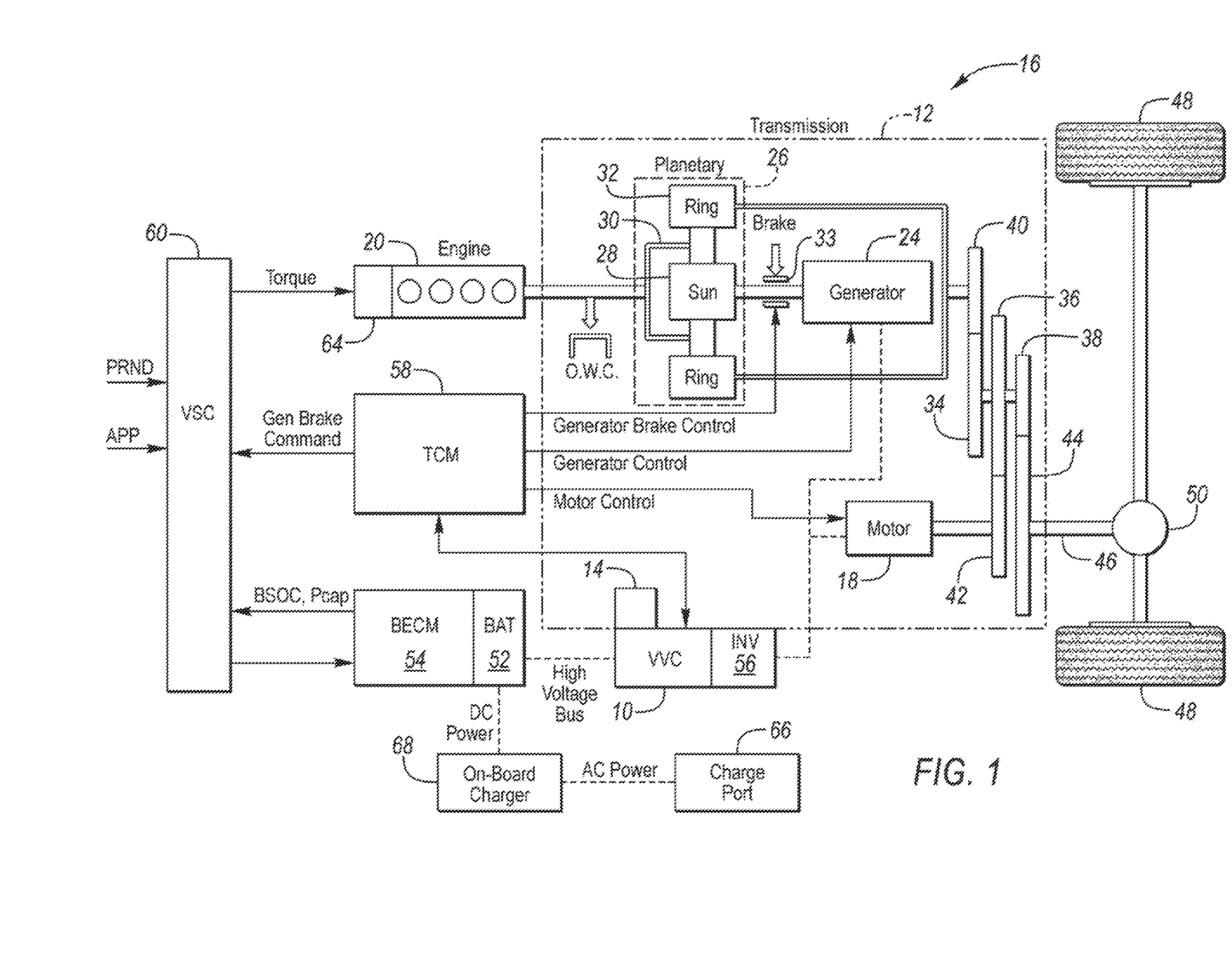
FIG. 1 is a schematic diagram of an example hybrid vehicle.

An example plugin-hybrid-electric vehicle (PHEV) is depicted in FIG. 1 and referred to generally as a vehicle 16. The vehicle 16 includes a transmission 12 and is propelled by at least one electric machine 18 with selective assistance from an internal combustion engine 20. The electric machine 18 may be an alternating current (AC) electric motor depicted as "motor" 18 in FIG. 1. The electric machine 18 receives electrical power and provides torque for vehicle propulsion. The electric machine 18 also functions as a generator for converting mechanical power into electrical power through regenerative braking.

The transmission 12 may be a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12. In other embodiments, the transmission does not have a power-split configuration.

The transmission 12 may include a planetary gear unit 26, which includes a sun gear 28, a planet carrier 30, and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The transmission 12 may further include a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48.

The vehicle 16 includes an energy storage device, such as a traction battery 52 for storing electrical energy. The battery 52 is a high-voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high-voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of a battery state of charge (BSOC) and a battery power capability ($P_{cap}$) to other vehicle systems and controllers.

The vehicle 16 includes a DC-DC converter or variable voltage converter (VVC) 10 and an inverter 56. The VVC 10 and the inverter 56 are electrically connected between the traction battery 52 and the first electric machine 18, and between the battery 52 and the second electric machine 24. The VVC 10 "boosts" or increases the voltage potential of the electrical power provided by the battery 52. The VVC 10 also "bucks" or decreases the voltage potential of the electrical power provided to the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the traction battery 52. Other embodiments of the transmission 12 include multiple inverters (not shown), such as one invertor associated with each electric machine 18, 24. The VVC 10 includes an inductor assembly 14.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58, and contactor control to the BECM 54.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

If the vehicle 16 is a PHEV, the battery 52 may periodically receive AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging. Although illustrated and described in the context of a PHEV 16, it is understood that the electric machines 18, 24 may be implemented on other types of electric vehicles, such as a hybrid-electric vehicle or a fully electric vehicle.

Figure 2:
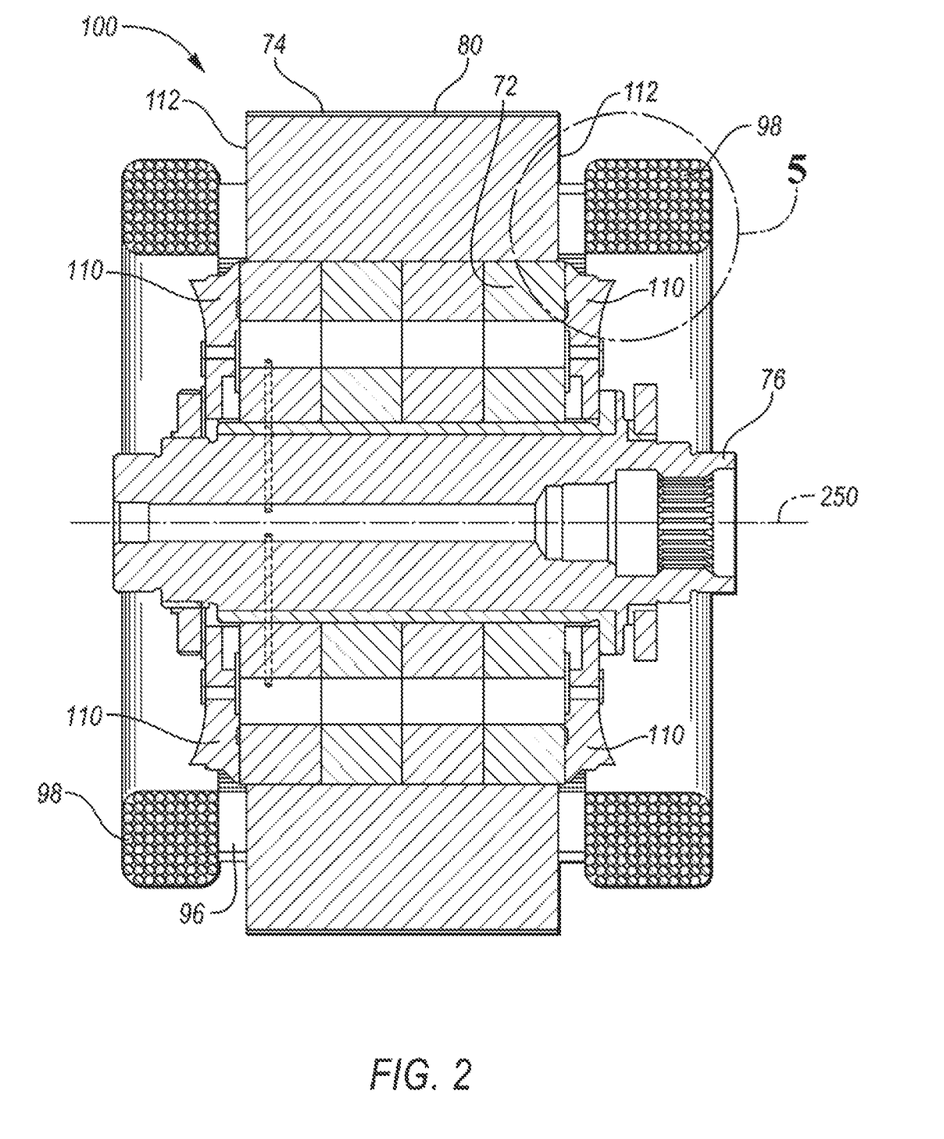
FIG. 2 is side view, in cross section, of a portion of an example electric machine.

Referring to FIG. 2, an example electric machine 100 includes a stator 74 having a plurality of laminations 78. Each of the laminations 78 includes a front side 101 and a back side. When stacked, the front and back sides are disposed against adjacent front and back sides to form a stator core 80. Each of the laminations 78 may be doughnut shaped and may define a hollow center. Each lamination 78 also includes an outer diameter (or outer wall) 82 and an inner diameter (or inner wall) 84. The outer diameters 82 cooperate to define an outer surface 86 of the stator core 80, and the inner diameters 84 cooperate to define a cavity 88.

Each lamination 78 includes a plurality of teeth extending radially inward toward the inner diameter. Adjacent teeth cooperate to define slots. The teeth and the slots of each lamination are aligned with adjacent laminations to define stator slots extending through the stator core 80 between the opposing end faces 112. A plurality of windings (also known as coils, wires, or conductors) 96 are wrapped around the stator core 80 and are disposed within the stator slots. The windings 96 may be disposed in an insulating material (not shown). Portions of the windings 96 generally extend in an axial direction along the stator slots. At the end faces 112 of the stator core 80, the windings bend to extend circumferentially around the end faces 112 of the stator core 80 forming the end windings 98. The end faces 112 define the opposing ends of the core 80 and are formed by the first and last laminations of the stator core 80. While shown as having distributed windings, the windings could also be of the concentrated type.

A rotor 72 is disposed within the cavity. The rotor 72 is fixed to a shaft 76 that is operably connected to the gearbox. When current is supplied to the stator 74, a magnetic field is created causing the rotor 72 to spin within the stator 74 generating a torque that is supplied to the gear box via one or more shafts.

During operation, the electric machine 100 generates heat within the stator core 80 and the windings 96. To prevent overheating of the electric machine, a fluid circuit may be provided to remove heat generated during operation. Coolant may enter the electric machine 100 through the drive shaft 76 rotating on axis 250. As the drive shaft 76 rotates, coolant flows through hollow tunnels into the rotor 72. Coolant is then released from the rotor endcaps 110. The endcaps 110 may have a curved or arcuate shape to sling coolant released from the rotor 72 to the end windings or end turns 98 at different axial locations.

Figure 3:
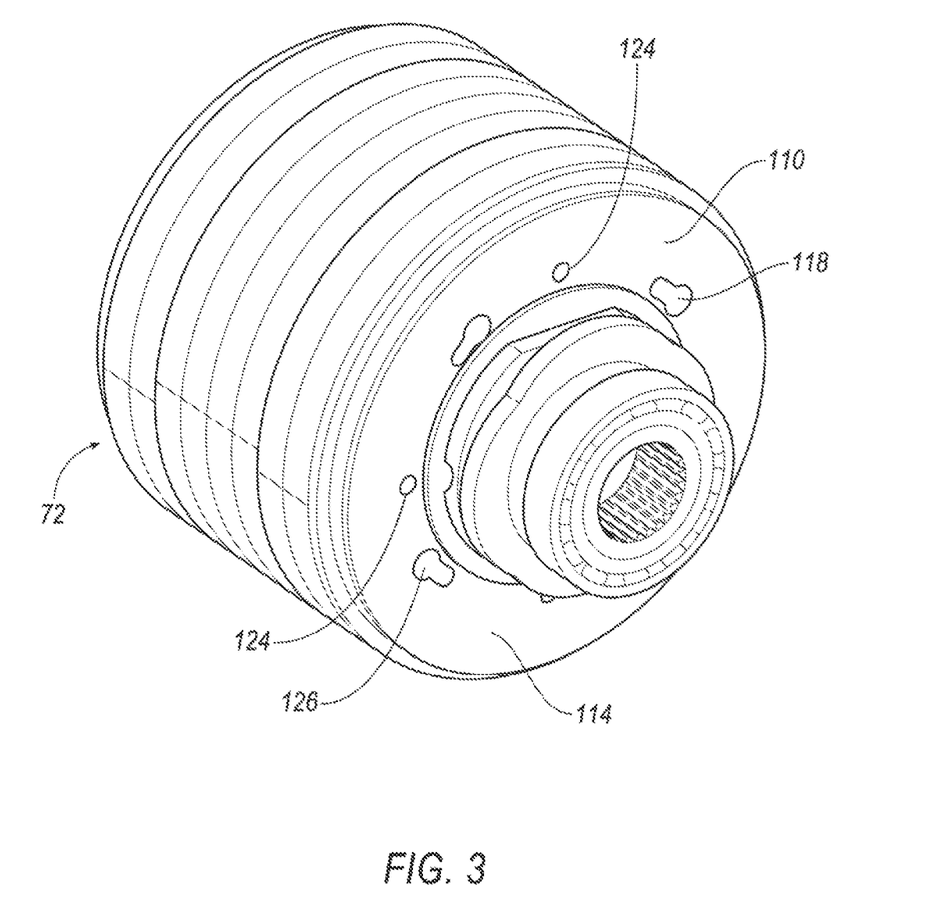
FIG. 3 illustrates a perspective view of an example electric machine having an endplate.

FIG. 3 illustrates a perspective view of an example electric machine 100. The electric machine may be a component of an electric vehicle (EV) including a hybrid electric vehicle (HEV) powered both by fuel and electricity, a plug-in hybrid electric vehicle (PHEV), and a battery electric vehicle (BEV). In electric vehicles, the efficiency of the machine may be very important and inefficiencies in the motor may cause a decrease in driving range.

The electric machine 100 may include two endplates 110 disposed on either side of the rotor 72. The rotor 72 may house a stator 74 configured to act as a magnet to allow energy to form and flow therethrough in an electric motor. The stator 74 may be made of iron, aluminum, steel, copper, etc. The stator 74 may be made of a plurality of laminations (not individually labeled) that are placed side-by-side and stacked to form the disk-like circular form of the stator 74. The laminations may form an iron core, or back iron, of the stator 74. The iron core may be a solid portion around the outer periphery of the stator 74. Each lamination may also form teeth (not specifically shown) extending radially inward from the back iron into the center of the stator 74. When aligned and stacked, the teeth extend axially along a length of the stator 74. The stator 74 teeth may be configured to maintain copper coils therebetween.

The coils may include a plurality of wires and may extend outward from the axial ends of the stator 74. These end portions are referred to as end windings and include the exposed portion of the coils. These end windings may receive a cooling medium, or coolant, such as transmission oil or other liquid to dissipate or extract heat.

The endplate 110 may be a circular disk having a disk-like body 114 configured to clamp to each end of the rotor 72. The endplate 110 may define cooling holes 124 circumferentially arranged about the center of the rotor endplate 110. The cooling holes 124 may be sized and placed so that as the level of fluid within the electric machine increases, some fluid is permitted to move through the endplate 110 to cool the rotor. The endplate 110 may also define assembly lift points 118 configured to be openings to facilitate picking and placing the electric machine within the transmission (not shown) during assembly.

Figure 4:
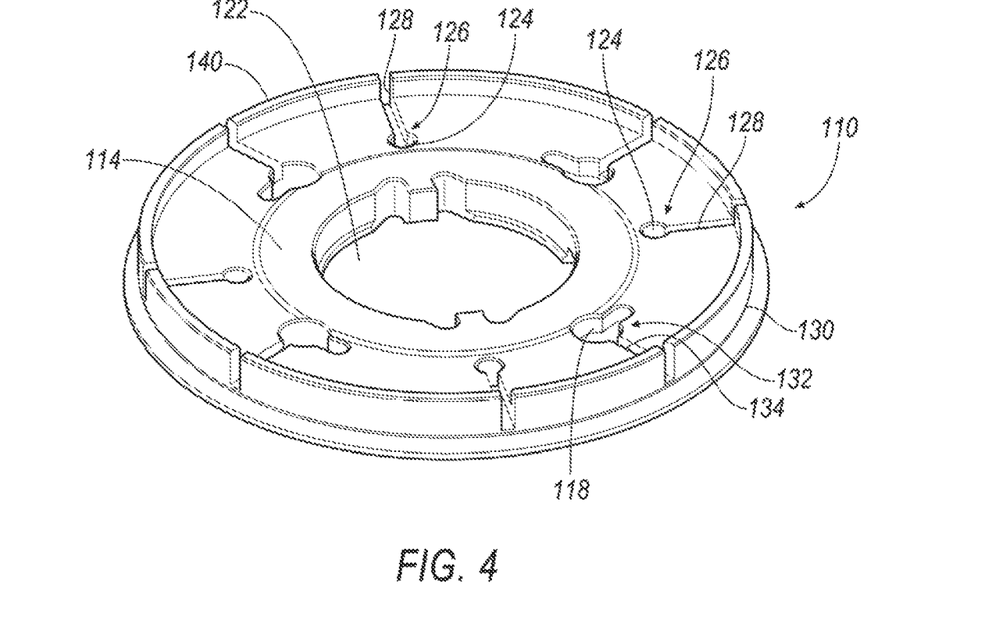
FIG. 4 illustrates an example perspective view of another endplate configured to be clamped on an electric machine.

FIG. 4 illustrates an example perspective view of another endplate 110 to be clamped on the rotor 72. The endplate 110 may be a circular disk configured to clamp to each end of the rotor 72, similar to the example of FIG. 13. The endplate 110 may define a locking area 122 defined in the center of the endplate 110 and configured to provide a locking mechanism for attaching or clamping the endplate 110 to the rotor 72.

The endplate 110 may define a plurality of cooling openings 126. The cooling openings 126 may be circumferentially arranged about the center of the endplate 110. The example in FIG. 4 illustrates four cooling openings 126 equidistantly spaced about the endplate 110. However, more or less, and in different spacing configurations, may be implemented. Furthermore, each of the cooling openings are arranged at a same, or near-same, diametric position along the endplate 110. The diametric location of the cooling openings 126 may vary from opening to opening, or the locations may be consistent among the openings as shown in FIG. 4.

Each cooling opening 126 may include a cooling hole 124 and a channel 128 extending therefrom. The channel 128 may extend to the outer diameter 130 of the endplate 110. The cooling openings 126, including the holes 124 and channels 128, may be sized and placed so that as the level of fluid within the electric machine increases, some fluid is permitted to move through the endplate to cool the rotor.

The endplate 110 may also define assembly lift openings 132 configured to be openings to facilitate picking and placing the electric machine within the transmission (not shown) during assembly. Similar to the cooling openings 126, the lift openings 132 may include a lift point 118. The lift openings 132 may be circumferentially arranged about the center of the rotor endplate 110. The example in FIG. 4 illustrates four lift openings 132 equidistantly spaced about the endplate 110. However, more or less, and in different spacing configurations, may be implemented. Furthermore, each of the lift openings 132 are arranged at a same, or near-same, diametric position along the endplate 110. The diametric location of the cooling openings 126 may vary from opening to opening, or the locations may be consistent among the openings as shown in FIG. 4.

Each lift opening 132 may include a lift channel 134 extending therefrom. The lift channel 134 may extend to the outer diameter 130 of the endplate 110. The lift openings 132, including the points 118 and channels 134, may be sized and placed so that as the level of fluid within the electric machine increases, some fluid is permitted to move through the endplate to cool the rotor.

During operation, fluid may be flowing in and around the end cap. This fluid is typically used to cool the stator 74 and the end winding extending therefrom. The cooling openings 124 and the lift openings 132 may allow the fluid to leave the stator 74, as well as to re-enter the stator 74 to further cool the end windings. The rotation of the rotor 72 may create a centrifugal force that causes the fluid to further move through the channels 128, 132.

A circumferential lip 140 may be arranged around the outer circumference 130 of the endplate 110 with openings aligned with the channels 128, 134. The circumferential lip 140 may extend axially or longitudinally as positioned in the motor (upwards from the endplate 110 in FIG. 4) and be integrally formed of unitary construction during casting of the endplate 110. The lip 140 may aid in keeping the cooling medium within the endplate 110 to direct the cooling medium to the channels 128, 134. The lip 140 may open at the channels 128, 134 to allow the fluid to leave therefrom. The lip 140 may allow fluid that has escaped through the cooling holes 124 and the lift points 118 to be directed back into the holes 124 and lift points 118 and through corresponding channels 128, 134. That is, instead of fluid leaving the various openings of the endplate 110 and exiting into the surrounding area, the fluid may be guided back into the cooling opening 126 and lift openings 132 by the lip 140 so that the fluid may be directed to the end windings of the stator 74 by the channels 128, 134.

Figure 5:
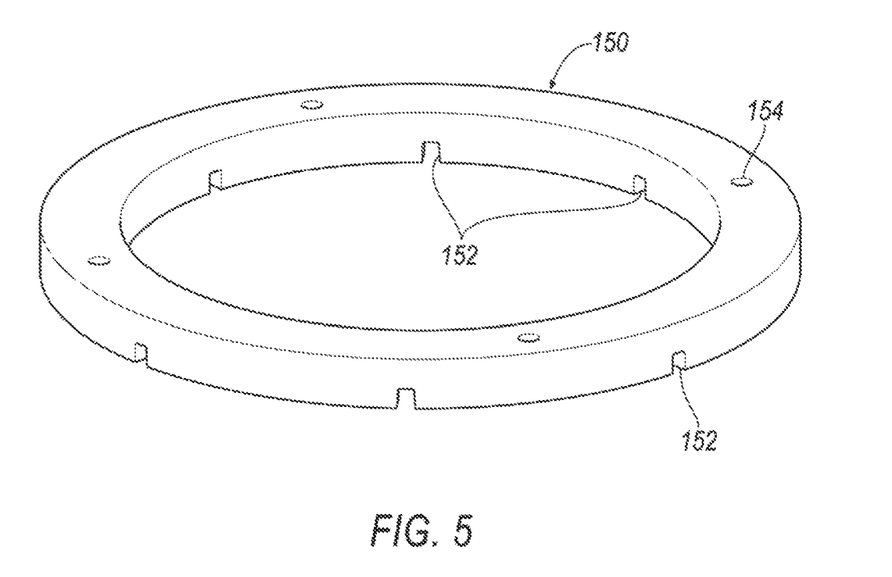
FIG. 5 illustrates a perspective view of an example lid to be arranged on the example endplate of FIG. 2.

FIG. 5 illustrates a perspective view of an example lid 150. The lid 150 is configured to be arranged on the endplate 110 of FIG. 3 such that the lid surrounds a lip (not shown) and at least a portion of the openings 126. The lid 150 may be a ring-like shape configured to surround and abut the lip. The lid 150 may define at least one recess configured to receive a bolt or other attachment mechanism to attach the lid 150 to the body 114 of the endplate 110.

The lid 150 may allow fluid that may otherwise be wasted, to be redirected into the openings 126. Not only will the otherwise wasted fluid be reused to cool the end windings, but the configuration created by the lid 50 and endplate 110 will allow for a more even distribution of the fluid, leading to more uniform cooling of the end windings as well. A cover (not shown) may be arranged over the ring-like lid 150 via bolts. Wherein the cover defines at least one notch 152 to correspond to each channel 126 in the installed state.

Figure 6:
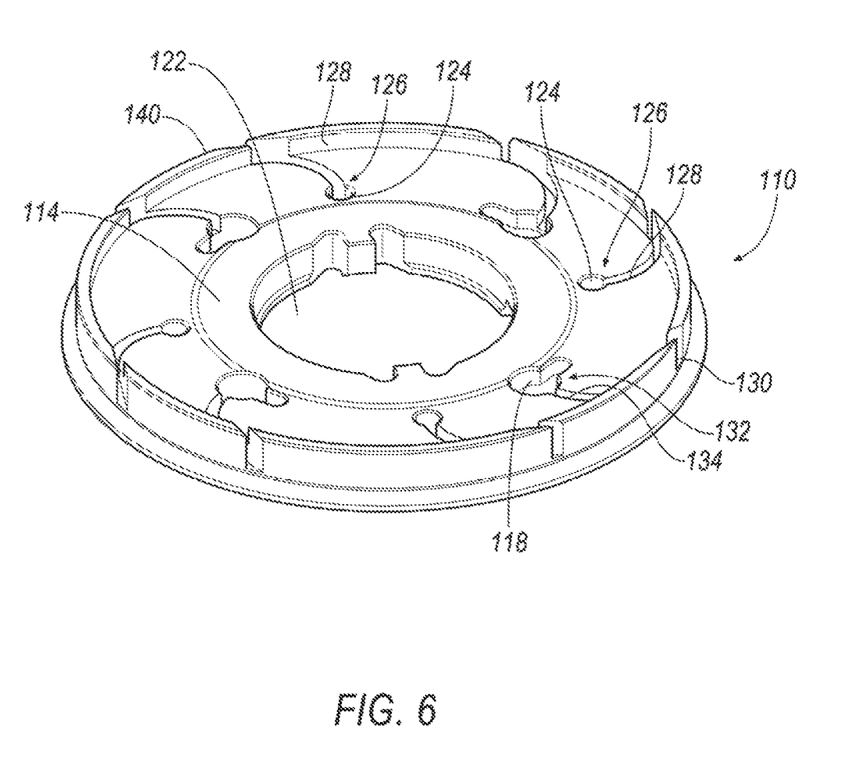
FIG. 6 illustrates another example perspective view of another endplate similar to FIG. 4.

FIG. 6 illustrates an example perspective view of another endplate 110 similar to FIG. 4. In this example endplate 110, the channels 128, 132 may extend at an angle or curve. Other channel configuration may also be included other than those shown in the figures.

Thus, the examples described herein may allow for improved cooling performance in terms of lowering the maximum and average end winding temperatures. This allows for higher cooling performance than traditional oil dripping, leading to significant reduction of the maximum and average operating temperatures. This improved coolant approach reduces the electric machine size requirements for a given torque output, increases electric machine torque densities, and increases efficiencies.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An endplate for an electric machine, comprising:
a disc-like body defining a plurality of openings and a corresponding channel extending from each of the plurality of openings, the corresponding channels extending from each of the plurality of openings to a distal diameter of the disc-like body, the plurality of openings configured to allow coolant to pass therethrough,
wherein at least a portion of the plurality of openings are lift points configured to facilitate picking and placing the electric machine;
a lip arranged around a circumference of the disc-like body and extending therefrom, the lip configured to guide the coolant into the plurality of openings to supply coolant at an end winding of a stator of the electric machine; and
a lid arranged on the disc-like body and configured to maintain the coolant within the lid and guide the coolant into the least one opening, wherein the lid defines at least one notch to correspond to the corresponding channel in the installed state.

2. The endplate of claim 1, wherein at least a portion of the plurality of openings are cooling holes configured to allow fluid to move through the endplate.

3. The endplate of claim 1, wherein the plurality of openings are equidistantly and circumferentially arranged around the disc-like body.

4. An endplate for an electric machine, comprising:
a disc-like body defining a plurality of openings and a corresponding channel extending from each of the plurality of openings, the corresponding channel extending from the at least one opening to a distal diameter of the disc-like body, at least one of the plurality of openings configured to allow coolant to pass therethrough,
wherein at least a portion of the plurality of openings are lift points configured to facilitate picking and placing the electric machine and wherein the plurality of openings are equidistantly and circumferentially arranged around the disc-like body;

a lip arranged around the distal diameter of the disc-like body and configured to guide the coolant into the at least one opening to supply coolant at an end winding of the electric machine; and a lid arranged on the disc-like body to maintain the coolant within the lid and guide the coolant into the least one opening, wherein the lid is a ring-like shape configured to be bolted to the disc-like body and wherein the lid defines at least one notch to correspond to the corresponding channel in the installed state.

5. The endplate of claim 4, wherein at least a portion of the plurality of openings are cooling holes configured to allow fluid to move through the endplate, and wherein the cooling holes are arranged in alternate arrangement with the lift points.

* * * * *